A. J. TARTISS.
SPOON.
APPLICATION FILED JAN. 20, 1914.
1,108,813.
Patented Aug. 25, 1914.
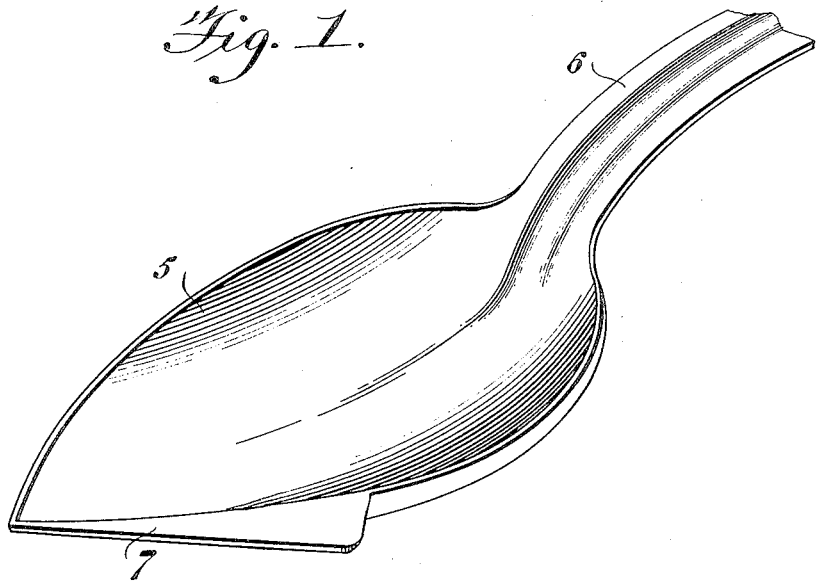
Witnesses
Inventor
A. J. Tartiss
By Victor J. Evans
Attorney

UNITED STATES PATENT OFFICE.

ALFRED J. TARTISS, OF ROCHESTER, NEW YORK.

SPOON.

1,108,813.

Specification of Letters Patent.   Patented Aug. 25, 1914.

Application filed January 20, 1914.   Serial No. 813,268.

*To all whom it may concern:*

Be it known that I, ALFRED J. TARTISS, a citizen of the United States, residing at Rochester, in the county of Monroe and State of New York, have invented new and useful Improvements in Spoons, of which the following is a specification.

The invention relates to spoons and has for a primary object to provide a spoon wherein the bowl portion is provided with a laterally extending flange forming a wing designed for stirring and evenly distributing food substance contained within a cooking utensil so as to obviate the sticking, scorching or burning of the said substance during the cooking process.

Another object of the invention is the provision of a spoon which is useful in the ordinary manner and which can be used for scraping purposes thus affording a handy kitchen article.

A still further object of the invention is the provision of a spoon of this character which is simple in construction, strong, durable and inexpensive in manufacture.

With these and other objects in view the invention consists in the construction, combination and arrangement of parts, as will be hereinafter pointed out, illustrated in the accompanying drawings and set forth in the claim hereunto appended.

In the drawing: Figure 1 is a perspective view of a spoon constructed in accordance with the invention. Fig. 2 is a vertical transverse sectional view through the bowl of the spoon.

Similar reference characters indicate corresponding parts throughout the drawings.

Referring to the drawings by numerals the spoon comprises a bowl 5 which is of the ordinary well-known shape and is integrally formed with a handle 6 the same being of any desirable length. The said spoon is preferably constructed of metal although it may be made from any other suitable material possessing the requisite rigidity necessary in the spoon.

Formed on one side edge of the bowl 5 and extending substantially one-half of the length of the same is a forwardly tapering laterally extending flange 7, the forward end of which merges into the tip 7 of the bowl 5, the flange being disposed in the same plane with the upper edge of the bowl and it is adapted to engage with the bottom of a vessel when the spoon is withheld in the hand of an operator or user so that on the manipulation of the spoon the bottom of the vessel may be scraped and at the same time the contents stirred and distributed thereby preventing the sticking, burning or scorching of the said contents of the vessel.

It is apparent that the spoon can be used in either hand and it is also capable of use in the ordinary well-known manner.

From the foregoing it is thought that the construction and operation of the invention will be clearly understood and therefore a more extended explanation has been omitted.

What is claimed is:

A spoon comprising an imperforate bowl, the margin of which is curved at its sides and pointed at its tip and a flange lying in the plane of said margin and having a straight edge disposed tangentially thereto at said tip.

In testimony whereof I affix my signature in presence of two witnesses.

ALFRED J. TARTISS.

Witnesses:
  LOLA A. OSBORNE,
  W. E. YOUNG.